United States Patent
Maeng

(10) Patent No.: US 11,615,470 B1
(45) Date of Patent: **\*Mar. 28, 2023**

(54) STOCK TRADING PLATFORM WITH SOCIAL NETWORK SENTIMENT

(71) Applicant: Wells Fargo Bank, N.A., San Francisco, CA (US)

(72) Inventor: Joon Maeng, Newcastle, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/565,239

(22) Filed: Dec. 29, 2021

Related U.S. Application Data

(63) Continuation of application No. 15/704,812, filed on Sep. 14, 2017, now Pat. No. 11,238,535.

(51) Int. Cl.
  *G06Q 40/00* (2012.01)
  *G06Q 40/04* (2012.01)
  *G06Q 50/00* (2012.01)

(52) U.S. Cl.
  CPC ............. *G06Q 40/04* (2013.01); *G06Q 50/01* (2013.01)

(58) Field of Classification Search
  CPC .................................................. G06Q 50/01
  See application file for complete search history.

(56) References Cited

U.S. PATENT DOCUMENTS

| | | | |
|---|---|---|---|
| 7,502,448 B1 | 3/2009 | Elman et al. | |
| 7,996,210 B2 | 8/2011 | Godbole et al. | |
| 8,239,964 B2 | 8/2012 | Halcrow et al. | |
| 8,301,545 B1 | 10/2012 | Shah | |
| 8,327,450 B2 | 12/2012 | Clement et al. | |
| 8,433,645 B1 | 4/2013 | Waelbroeck et al. | |
| 8,463,688 B2 | 6/2013 | Ritterman et al. | |
| 8,478,676 B1 | 7/2013 | Jennings et al. | |
| 8,600,858 B1 | 12/2013 | Kamruddin | |
| 8,606,685 B2 | 12/2013 | Keiser et al. | |
| 8,818,958 B2 | 8/2014 | Murphy et al. | |
| 8,856,056 B2 | 10/2014 | Di Sciullo et al. | |
| 9,104,734 B2 | 8/2015 | Blaschak et al. | |
| 10,185,996 B2 | 1/2019 | Lee et al. | |
| 2010/0042553 A1 | 2/2010 | Van Erlach | |

(Continued)

OTHER PUBLICATIONS

"U.S. Appl. No. 15/704,812, Advisory Action dated Nov. 13, 2020", 3 pgs.

(Continued)

*Primary Examiner* — Narayanswamy Subramanian
(74) *Attorney, Agent, or Firm* — Schwegman Lundberg & Woessner, P.A.

(57) ABSTRACT

The innovation disclosed and claimed herein, in one aspect thereof, comprises systems and methods of stock trading using social network sentiment. The system and method can receive a trading order entry for a stock asset having at least one condition to execute, wherein the at least one condition to execute is based on a social network sentiment. The system and method monitors the stock asset for conditions to execute and monitors a tracking social network sentiment of the stock asset. The system and method can determine if the conditions to execute satisfied. The system and method can execute a stock trade according to the trading order entry based on the determination.

20 Claims, 7 Drawing Sheets

(56) References Cited

U.S. PATENT DOCUMENTS

| | | | |
|---|---|---|---|
| 2012/0041890 A1* | 2/2012 | Ng | G06Q 40/06 705/36 R |
| 2012/0209786 A1 | 8/2012 | Shah et al. | |
| 2012/0296845 A1 | 11/2012 | Andrews et al. | |
| 2012/0316916 A1 | 12/2012 | Andrews et al. | |
| 2012/0330809 A1 | 12/2012 | Bouchard | |
| 2012/0330812 A1 | 12/2012 | Bouchard | |
| 2013/0018957 A1 | 1/2013 | Parnaby et al. | |
| 2013/0138577 A1 | 5/2013 | Sisk | |
| 2014/0089125 A1 | 3/2014 | Kinnersley | |
| 2014/0101247 A1 | 4/2014 | Pappas | |
| 2014/0172751 A1 | 6/2014 | Greenwood | |
| 2014/0207525 A1 | 7/2014 | Dandekar et al. | |
| 2015/0012331 A1* | 1/2015 | Carter | G06Q 50/01 705/7.29 |
| 2016/0232463 A1 | 8/2016 | Mcdonough et al. | |
| 2016/0239918 A1 | 8/2016 | Lambur et al. | |
| 2017/0039608 A1 | 2/2017 | Sandre et al. | |
| 2017/0098170 A1 | 4/2017 | Sardela Bianchi et al. | |
| 2017/0249701 A1 | 8/2017 | Pabrai | |
| 2020/0151745 A1 | 5/2020 | Palestrant et al. | |

OTHER PUBLICATIONS

"U.S. Appl. No. 15/704,812, Examiner Interview Summary dated Aug. 26, 2021", 2 pgs.

"U.S. Appl. No. 15/704,812, Examiner Interview Summary dated Oct. 27, 2021".

"U.S. Appl. No. 15/704,812, Final Office Action dated Aug. 4, 2020", 35 pgs.

"U.S. Appl. No. 15/704,812, Final Office Action dated Sep. 9, 2021".

"U.S. Appl. No. 15/704,812, Non Final Office Action dated Jul. 22, 2021".

"U.S. Appl. No. 15/704,812, Non Final Office Action dated Oct. 28, 2019", 29 pgs.

"U.S. Appl. No. 15/704,812, Notice of Allowance dated Dec. 1, 2021".

"U.S. Appl. No. 15/704,812, Response filed Jan. 28, 2020 to Non Final Office Action dated Oct. 28, 2019", 15 pgs.

"U.S. Appl. No. 15/704,812, Response filed Aug. 31, 2021 to Non Final Office Action dated Jul. 22, 2021", 11 pgs.

"U.S. Appl. No. 15/704,812, Response filed Oct. 5, 2020 to Final Office Action dated Aug. 4, 2020", 12 pgs.

"U.S. Appl. No. 15/704,812, Response filed Oct. 28, 2021 to Final Office Action dated Sep. 9, 2021", 10 pgs.

"U.S. Appl. No. 15/704,812, Supplemental Amendment filed Nov. 5, 2021", 10 pgs.

Cakra, Y, et al., "Stock Price Prediction using Linear Regression based on Sentiment Analysis", ICACSIS, (2015), 147-154.

Saumya, S, et al., "Predicting Stock Movements Using Social Network", Proceedings LNCS 9844, (2016), 567-572.

Wenting, Tu, et al., "Investment Recommendation using Investor Opinions in Social Media", SIGIR, (2016), 881-884.

U.S. Appl. No. 15/704,812, filed Sep. 14, 2017, Stock Trading Platform with Social Network Sentiment.

* cited by examiner

STOCK TRADING PLATFORM WITH SOCIAL NETWORK SENTIMENT

CROSS-REFERENCE TO RELATED APPLICATIONS

This patent application is a continuation of U.S. patent application Ser. No. 15/704,812, now U.S. Pat. No. 11,238,535 filed Sep. 14, 2017, which is hereby incorporated by reference herein in its entirety.

BACKGROUND

Public sentiment and real life events increasingly affect stock market prices. Stock share prices are determined by many factors such as company performance, earnings reports, political events, geopolitical news, economic news, new product release, bad weather, problems in supply chain, rumors, and/or the like. Many of these factors are linked to public sentiment. Public sentiment can be gauged by social media networks in view of posts, comments, articles, and/or the like. It can be difficult to monitor the public sentiment according to stock price, especially in real time in a fast changing news cycle. There is a desire to provide a solution that can help investors utilize sentiment of social networks along with traditional data such as fundamental analysis and technical analysis for trading stocks.

BRIEF SUMMARY OF THE DESCRIPTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems and methods of stock trading using social network sentiment. A method can receive a trading order entry for a stock asset having at least one condition to execute, wherein the at least one condition to execute is based on a social network sentiment. The method monitors the stock asset for conditions to execute and monitors a tracking social network sentiment of the stock asset. The method can determine if the conditions to execute satisfied. The method can execute a stock trade according to the trading order entry based on the determination.

A system of the innovation can include a trade management component that receives a trading order entry for a stock asset having at least one condition to execute, wherein the at least one condition to execute is based on a social network sentiment. The system can include a stock market gateway that monitors the stock asset for conditions to execute and a social network gateway that monitors a tracking social network sentiment of the stock asset. The system can include a determination component that determines if the conditions to execute satisfied. The trade management component can execute a stock trade according to the trading order entry based on the determination.

In aspects, the subject innovation provides substantial benefits in terms of stock trading and timing. One advantage resides in a better understanding of real life factors that can affect stock price. Another advantage resides in a quicker response to real life factors that affect stock price.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

Figure 1:
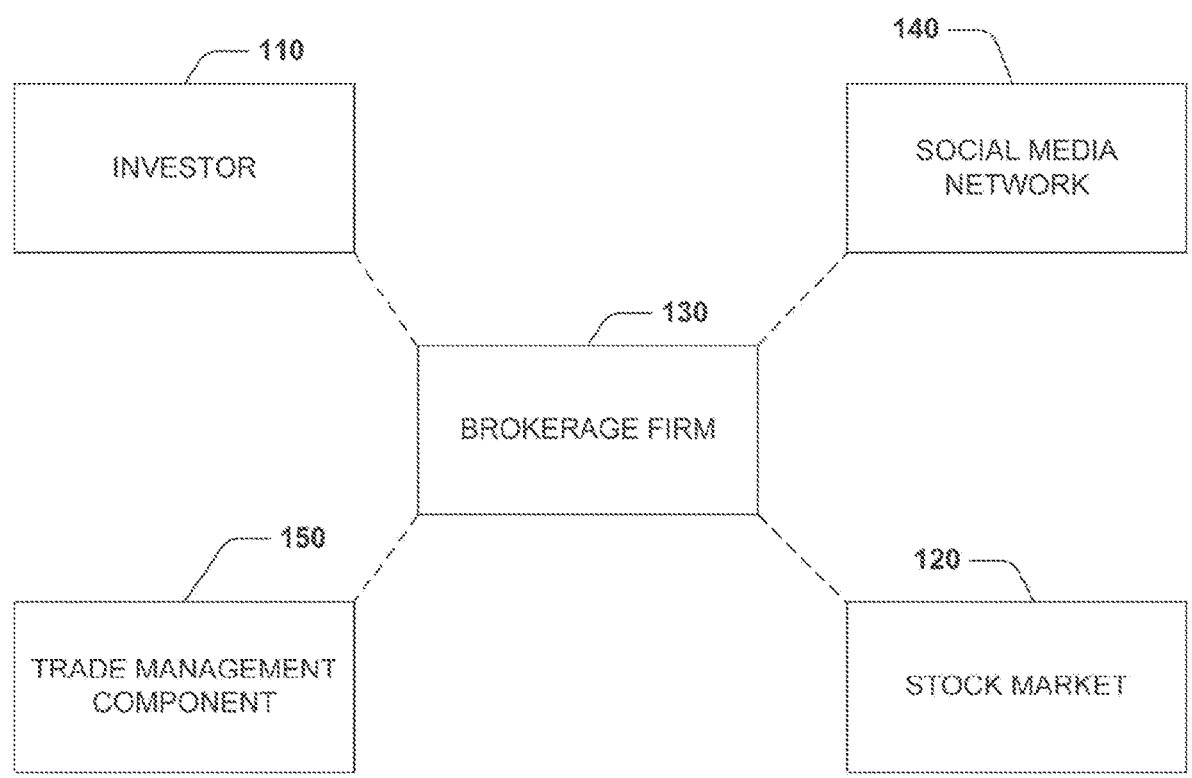
FIG. 1 illustrates an example component diagram of a system of the present innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component". "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

While certain ways of displaying information to users are shown and described with respect to certain figures as screenshots, those skilled in the relevant art will recognize that various other alternatives can be employed. The terms "screen," "web page," "screenshot," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

FIG. 1 illustrates an exemplary system 100 for a stock trading platform with social network sentiment. The system 100 includes an investor 110. The investor 110 can be an individual, a group of people, or an organization that can buy or sell stock assets, or securities, traded in a stock market 120. In some embodiments, the investor 110 may use a web browser, mobile device, and/or an application program in a computing device to trade securities with a service provided by a brokerage firm 130. The brokerage firm 130 facilitates trading of securities between buyers and sellers. In some embodiments, the brokerage firm 130 provides an online portal or network to connect to buyers, sellers, the investor 110, stock markets 120, social networks 140, and/or the like. The brokerage firm 130 serves a clientele of investors that trade public stocks and other securities including mutual funds, ETFs, bonds, CDs, and/or the like.

The stock market 120 can be an equity market or share market. The stock market 120 can be a generic representation of the aggregation of buyers and sellers of stock and other investment securities; for example, securities listed on a public stock exchange, bonds, mutual funds, money market. ETFs and/or the like.

The brokerage firm 130 can connect to a social network(s) 140. The social network 140 is a representation of a social structure made up of a set of social actors (such as individuals or organizations), sets of dyadic ties, and other social interactions between actors. In some embodiments, the social network 140 may be an online community such as web blogs, web media, and online networking sites such as Facebook®, Twitter®, Tumblr®, Instagram®, Skype®. LinkedIn®, and/or Snapchat®. In other embodiments, the social network 140 may be connected to a communication network such as the Internet. The social network 140 includes a sentiment about social actors. The social actors can be observed directly from online social media such as Twitter® and Facebook® and indirectly by monitoring newspaper. TV, content from blogs, or other type of media generation tools.

The system 100 includes a trade management component 150. In some embodiments, the trade management component 150 is integrated into the brokerage firm 130. The trade management component 150 serves as a platform for investors 110 to use in trading securities. The trade management component 150 can monitor (or datamine) the social network 140 to determine social sentiments for stock assets. The trade management component 150 can receive a trading order entry for a stock asset. The trading order entries have at least one condition to execute such as stock price, closing price, opening price, and/or the like.

In some embodiments, a condition to execute can be based on a social network sentiment about the stock. The trade management component 150 can perform sentiment analysis on a stock to determine the social network sentiment meets a condition to execute. A sentiment analysis, e.g. opinion mining, is the analysis of the feelings (e.g. attitudes, emotions, opinions, and/or the like) behind the words, or posts/comments, in the social network 140. In some embodiments, the trade management component 150 can utilize various software tools such as natural language processing or artificial analysis tools. The trade management component 150 monitors the social network for opinions in content on the social network. An opinion is an expression that consists of two key components: a target (which may be called "topic") and a sentiment on the target. The target may be a company or stock.

Analytics can be performed on different types of content. For example, the trade management component 150 can analyze "likes" on a social network to see number of likes per a specified duration, and % of change for a specified content, and/or the like. The trade management component 150 can analyze "posts" on the social network for total number of post, % of change, rate of change, post types, and/or the like. The trade management component 150 can analyze "comments" to post for total number of comments, % change, types of comments per post, and/or the like. In some embodiments, the trade management component 150 can analyze feelings on events such as terrorist attacks, earthquakes, new products release, part shortages, and/or the like. The trade management component 150 can determine a "social network sentiment" which is a score for a sentiment on an individual security, a sector, stock market, and/or the like.

In some embodiments, the sentiment includes more than the number of likes, posts or comments. The sentiment can include feelings on ad campaigns, product release, blog post, and video to understand how people are responding to it. For example, the sentiment analysis can determine "Was the review positive?Negative? Sarcastic? Ideologically biased?" Some social network sentiments may be derived from a combination of sentiment or with weighting parameters. There are many ways to convert sentiment to a measurable metric and use the metric to express opinion of content. The metric may be numbers. %, derivatives, weighted numbers, or the like.

The trade management component 150 determines the conditions to execute have been met. The trade management component 150 then executes a stock trade according to the trading order entry. The stock trade is made through the brokerage firm 130 over the stock market 120. In some embodiments, an alert is generated and communicated to the investor 110. The alert may be text. SMS, MMS, email, voice message, push notification, and/or the like.

Figure 2:
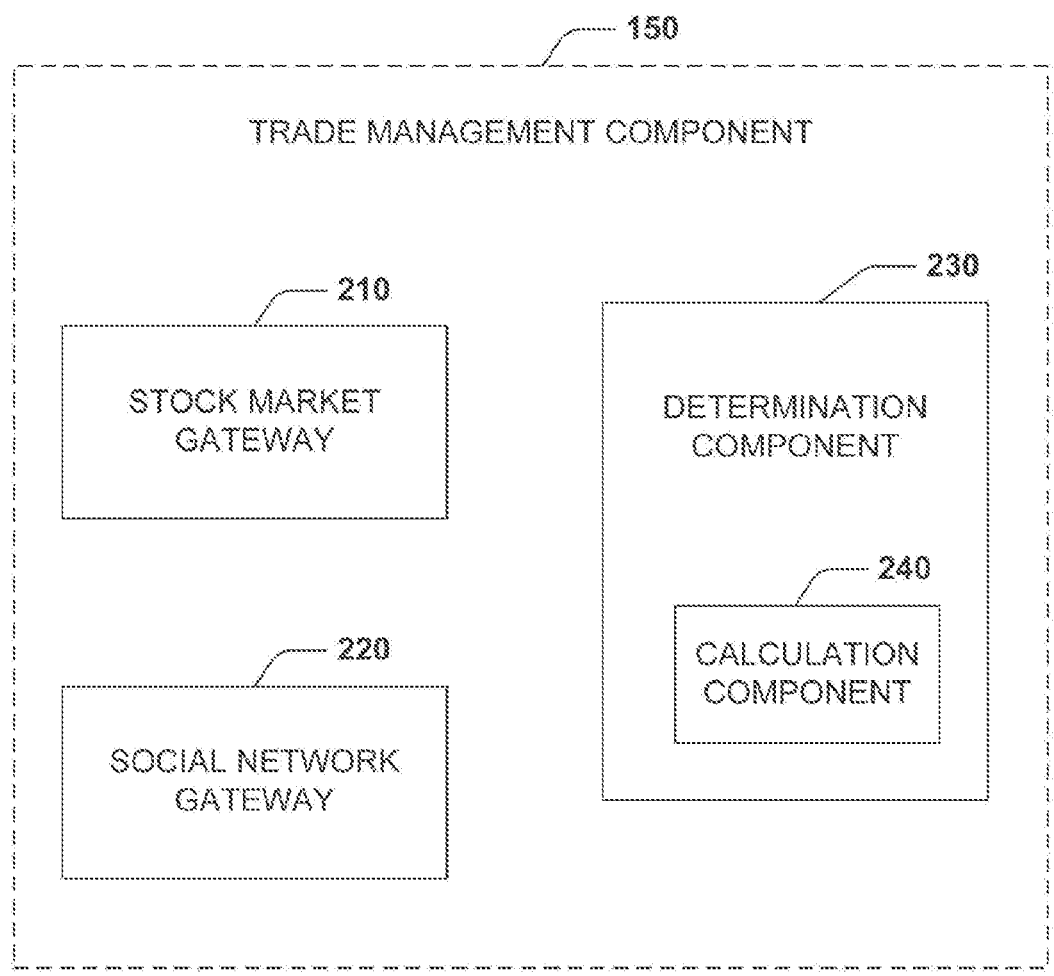
FIG. 2 illustrates an example component diagram of a trade management component.

FIG. 2 illustrates a detailed component diagram of the trade management component 150. The trade management component 150 receives a trading order entry from the investor 110. In some embodiments, the trade management component 150 provides a trading order entry form to the investor to facilitate input of the fields of information for at trading order entry. The trading order entry includes conditions to execute. The conditions dictate when a stock should be traded in the future. The conditions to execute can be based on social network sentiments.

The trade management component 150 includes a stock market gateway 210. The stock market gateway 210 is an interface with the stock market 120, that transmits investors 110 trading orders to the stock market 120 and retrieves results on trading orders and exchanges other information between the brokerage firm 130 and the stock market 120.

The trade management component 150 includes a social network gateway 220. The social network gateway 220 interfaces with social networks 140. The social network gateway 220 monitors the social networks to facilitate determining a tracking social network sentiment. The tracking social network sentiment is the instant social network sentiment at a specific moment in time. The social network gateway 220 retrieves social network factors from the social network 140. The social network factors can include one of total number of posts, number of likes, number of dislikes, comments, rate of change, type, percent change, feeling on events, or market sentiment, and/or other information as described above.

In some embodiments, the social network gateway 220 interfaces with social network analytics providers that may preform analytics on social networks and obtain sentiment data from companies (e.g., Google Alerts®, Meltwater®, People Browser®, Hootsuite®, Tweetstats®, Facebook Insights®, Social Mention®, Pagelever®) which preform analytics on social networks.

The trade management component 150 includes a determination component 230. The determination component 230 determines whether the conditions to execute are met according to the trading order entry. The determination component 230 receives stock market information from the stock market gateway 210 in real or near real time. The determination component 230 continuously compares the stock market information to the conditions to execute when a condition to execute is based on a stock market information. For example, the determination component 230 can continuously receive a tracking stock price for a stock from the stock market gateway 210 and compare the tracking stock price to a pre-selected stock price. The condition to execute can be when the tracking stock price comes above or below the pre-selected stock price. When the tracking stock price meets the pre-selected stock price, the determination component 230 determines the condition to execute is met and the trade management component 150 can execute a trade when all conditions to execute are met.

The determination component 230 includes a calculation component 240. The determination component 230 receives the social network factors from the social network gateway 220. The calculation component 240 determines the tracking social network sentiment of a stock(s) to facilitate determining whether the tracking social network sentiment meets a pre-selected social network sentiment as a condition to execute. The calculation component 240 calculates the social network sentiment using the social network factors retrieved by the social network gateway 220 as described above. In some embodiments, the calculation component 240 can calculate a weighted average of the social network factors for the social network sentiment. In other embodiments, the calculation component 240 normalizes the tracking social network sentiment to a score metric out of 100.

The determination component 230 can continuously receive a tracking social network sentiment for a stock from the calculation component 240 and compare the tracking social network sentiment to a pre-selected social network sentiment. The condition to execute can be when the tracking social network sentiment is above or below the pre-selected social network sentiment. When the tracking social network sentiment meets the pre-selected social network sentiment, the determination component 230 determines the condition to execute is met and the trade management component 150 can execute a trade when all conditions to execute are met.

Figure 3:
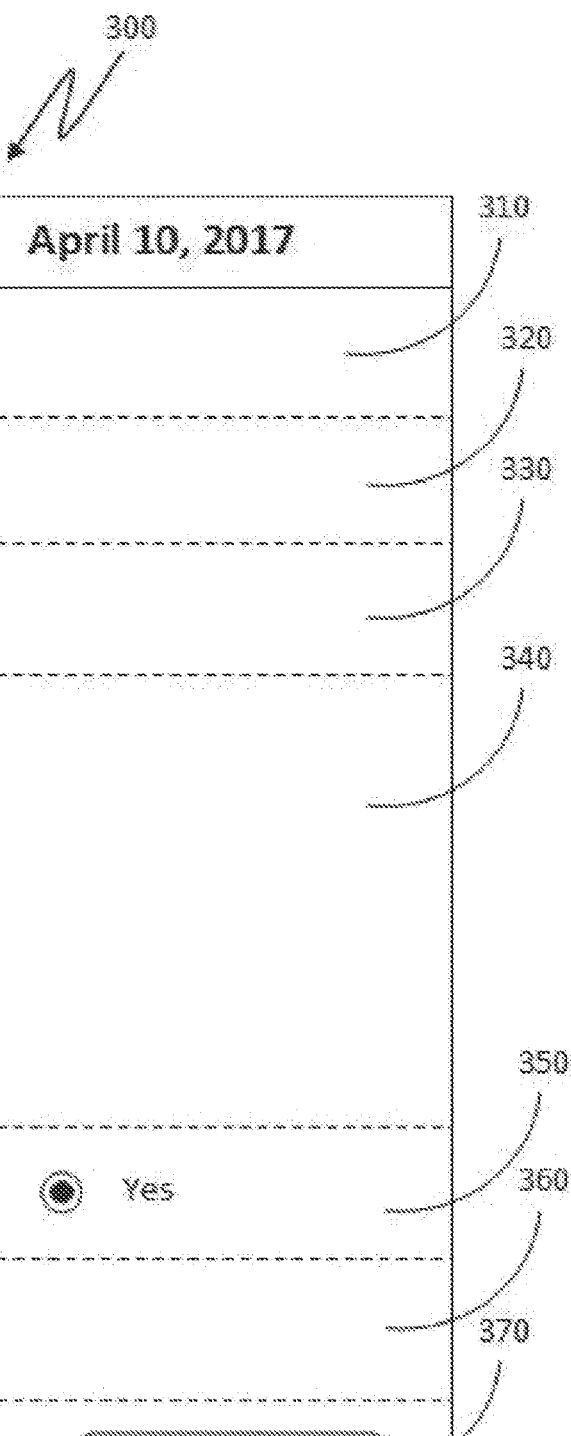
FIG. 3 illustrates an example trading order entry form.

FIG. 3 illustrates an example trading order entry form 300 (or user interface) that an investor 110 or brokerage firm 130 may use to receive a trading order entry. The investor 110 (or stock trader/empowered agent) enters a stock symbol 310 of the stock to be traded. An action 220 to buy or sell the stock can be selected. The investor 110 can enter a number of shares (or monetary value) to trade in the quantity 230 and can choose an order type 240.

The order type can be market order, limit order with a desired price in the box, stop order with a desired price in the box, stop limit order, or market on close order. Where market order is a buy order or sell order to be executed immediately at current market prices. The limit order instructs the brokerage firm 130 to buy or sell a security at or below the specified price. Limit orders remain in effect until they are executed, canceled, or expires. The stop order is an order to buy or sell a stock once the price of the stock reaches the specified price, known as the stop price. When the stop price is reached, a stop order becomes a market order. The stop-limit order is an order placed with a broker that combines the features of stop order with those of a limit order. A stop limit order will be executed at a specified price (or better) after a given stop price has been reached. Once the stop price is reached, the stop-limit order becomes a limit order to buy (or sell) at the limit price or better. When the stop limit order is selected, a new window may be opened to allow entry of stop price and limit price. There may be other types of order such as market-if-touch order, which is an order to buy at the best available price, if the market price goes down to the "if touched" level.

The investor 110 may select a condition to "Apply social network sentiment?" 350. In some embodiments, the default condition is "No" where the trading order entry does not apply the social network sentiment. When the social network sentiment 350 is no, the stock trading system executes the order as if the trade is placed in a traditional stock trading system where orders are executed with a selected order type 340. If the investor selects "Yes", the stock trading system applies the social network sentiment. In some embodiments, the social network sentiment can be defined in advance or may open a window to define a custom condition for social network sentiment, if the trade has not defined the condition yet. For example, a social network sentiment based on number of posts (i.e. a post sentiment) may have a greater effect or a higher correlation to the stock price than other sentiments such as a market sentiment. The investor 110 may choose a specific sentiment that is preferred.

In some embodiments, the investor 110 may specify social network sentiment as a condition to trigger a trading window. For example, the social network sentiment which may be monitored continuously in real time can trigger a trading window when a pre-specified condition is met. For instance, the investor 110 may be interested in stock ABC and waiting for a rumor on new product release. If a social network sentiment monitors chats among social network users on the social network 140 and detects a credible rumor on new product release from the chats, it may invoke and pop-up the trading entry form (or window) for stock ABC so that the investor 110 can specify trading condition or dismiss it after reviewing the sentiment and/or its sources. The investor 110 may enter the duration of the order to execute in 360 and preview the order 370 to review the trading order entry 300 before placing the order.

Figure 4:
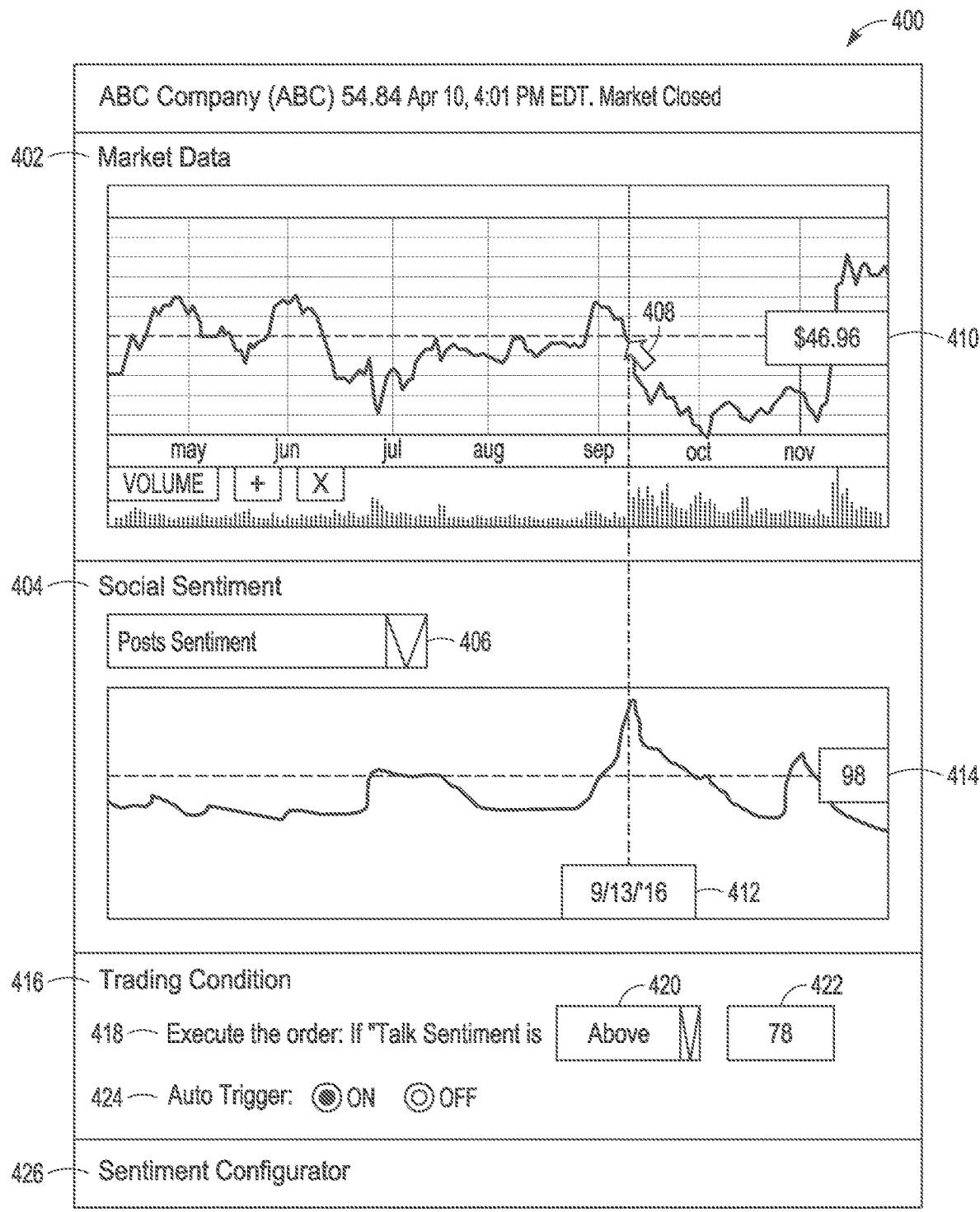
FIG. 4 illustrates an example trading charts for sentiment selection.

FIG. 4 illustrates example plots 400 of a tracking stock price, a conditional stock price, a tracking social network sentiment, and conditional social network sentiment. For example, ABC company stock (symbol: ABC) chart shows multiple components. The first window 402 shows a plot of traditional stock price and trading volume. The second window 404 displays a tracking social sentiment value of a selected sentiment 406. Both plots are on a synchronized time x-axis. The investor 110 may select a desired sentiment 406 from multiple available sentiment metrics. When the investor 110 moves a cursor 408 along the price line, the example plots 400 show a stock price 410 and a date 412 and sentiment score 414 for the selected sentiment 406.

In some embodiments, the charts 400 may show a correlation parameter(s) between the price 410 and selected sentiment 412. In some embodiments, the correlation between stock price and sentiment may be expressed in numbers, between 0 and 100 for example. When a social network sentiment 412 is closely related to the stock price change, the correlation is high and when a social network sentiment 412 is less related to the stock price change, the correlation is low. The investor 110 may select a sentiment to be associated with a chosen stock (e.g., ABC) based on the correlation.

In the third window 416, the investor 110 specifies trading conditions 418 where the investor 110 can select the relative condition 420 such as above, below, equal to, or other and specify the sentiment metric 422. The investor 110 may select auto trigger 424 ON or OFF. When the auto trigger 424 is ON and the trading is not defined and the condition will invoke a trading entry window for the investor 110 to specify. If the trading condition is specified and the auto trigger 424 is ON, trading may be executed automatically. If the auto trigger 424 is set to OFF when the trading is specified, the trading window asked in a pop up window if the transaction should be executed to the investor 110.

An investor 110 may open a sentiment configurator 426 to select a pre-defined sentiment analysis. In some embodiments, the investor 110 may customize a sentiment from multiple sources of sentiments in the sentiment configurator 426. For example, the investor 110 may select a set of sentiments and assign a weight on each to produce a customized sentiment. The investor 110 can view correlation between the price and the sentiment defined or selected and/or pick pre-defined sentiments with a social sentiment 406 dropdown menu.

Figure 5:
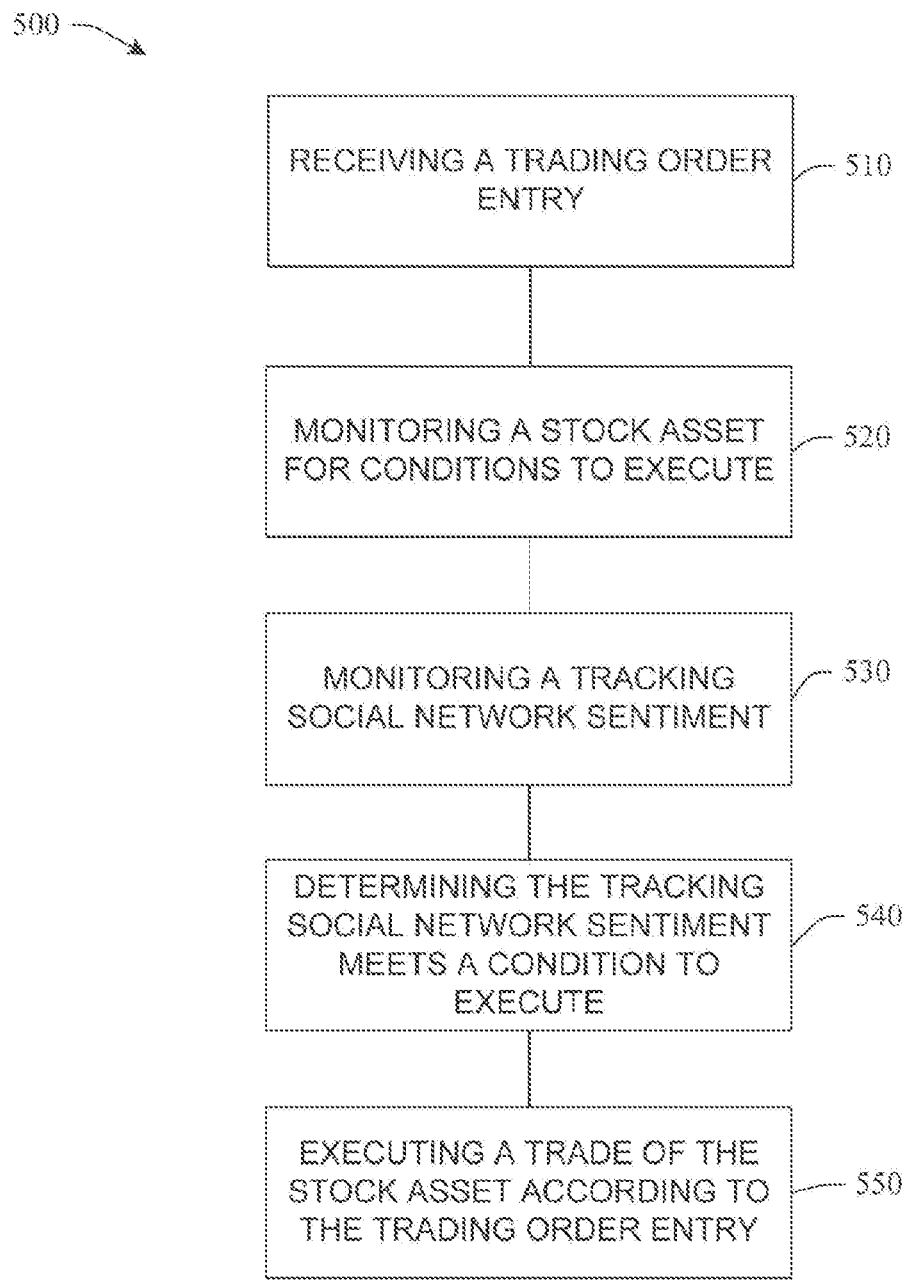
FIG. 5 illustrates a method for executing trades using social network sentiment.

With reference to FIG. 5, example methods 500 are depicted for authenticating a user to verify identity. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram Moreover, not all illustrated acts may be required to implement a methodology in accordance with the innovation. It is also appreciated that the method 500 are described in conjunction with a specific example is for explanation purposes.

FIG. 5 illustrates a method 500 for a stock trading with social network sentiment. The method 500 can begin at 510 by receiving a trading order entry. The trading order entry includes conditions to execute and other trading information as described above. In some embodiments, one condition to execute is based on a pre-selected social network sentiment score or metric. At 520, the stock asset indicated in the trading order entry is monitored for conditions to execute. For example, the trading order entry includes a condition to execute to sell the stock if it decreases to X amount of dollars per share. The stock asset is monitored for the tracking, or real time, price in relation to the condition to execute.

At 530, a tracking social network sentiment of the stock asset is monitored for conditions to execute. For example, the trading order entry includes a condition to execute based on number of negative posts about the stock asset or company on a social network in a pre-defined amount of time (such as 24 hours). The negative posts factor into calculating a tracking social network sentiment that is compared to a minimum threshold social network sentiment.

At 540, the conditions to execute a trade are determined to be satisfied. In the example, the tracking social network sentiment has reached the minimum threshold social network sentiment and the tracking stock price has reached the pre-selected share price as described in the trading order entry. At 550, the stock assets are traded according to the trading order entry. The stock assets are sold through a brokerage firm on a stock market to a buyer on the stock market. In some embodiments, a trading order entry may determine a buy order instead of a sell order, and/or the like.

Figure 6:
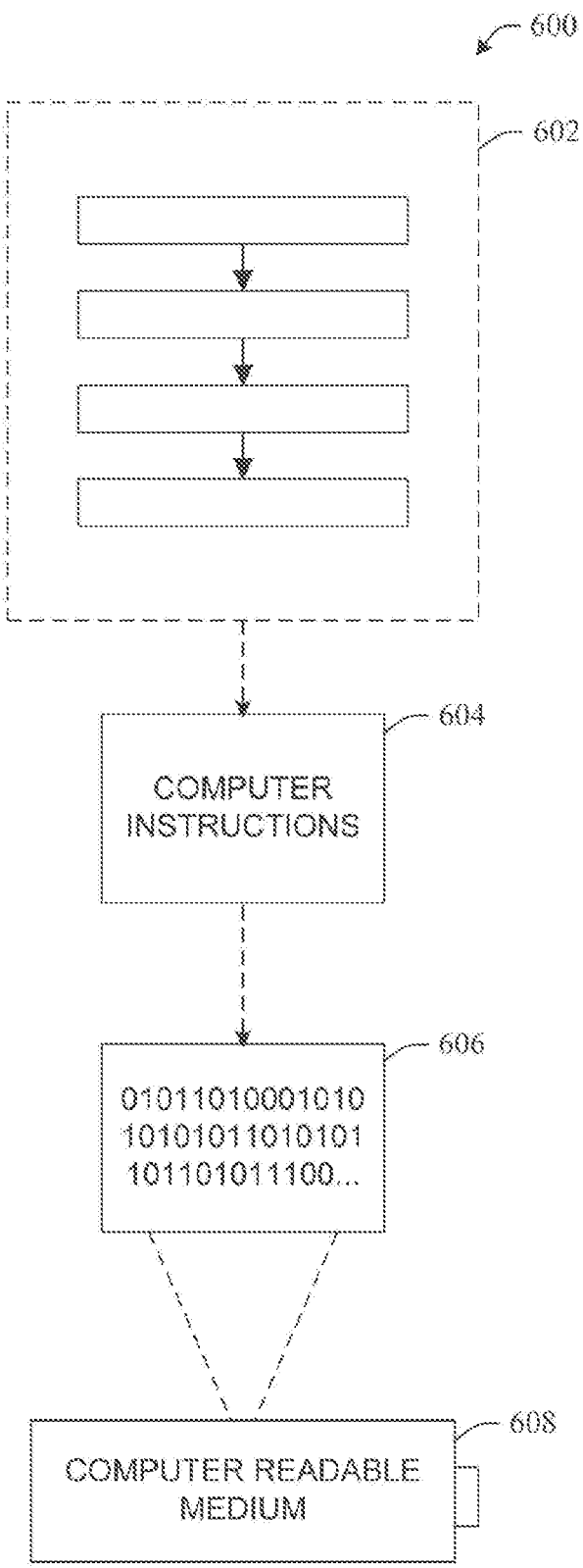
FIG. 6 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 6, wherein an implementation 600 comprises a computer-readable medium 608, such as a CD-R, DVD-R, flash drive, a platter of a hard disk drive, etc., on which is encoded computer-readable data 606. This computer-readable data 606, such as binary data comprising a plurality of zero's and one's as shown in 606, in turn comprises a set of computer instructions 604 configured to operate according to one or more of the principles set forth herein. In one such embodiment 600, the processor-executable computer instructions 604 is configured to perform a method 602, such as at least a portion of one or more of the methods described in connection with embodiments disclosed herein. In another embodiment, the processor-executable instructions 604 are configured to implement a system, such as at least a portion of one or more of the systems described in connection with embodiments disclosed herein. Many such computer-readable media can be devised by those of ordinary skill in the art that are configured to operate in accordance with the techniques presented herein.

Figure 7:
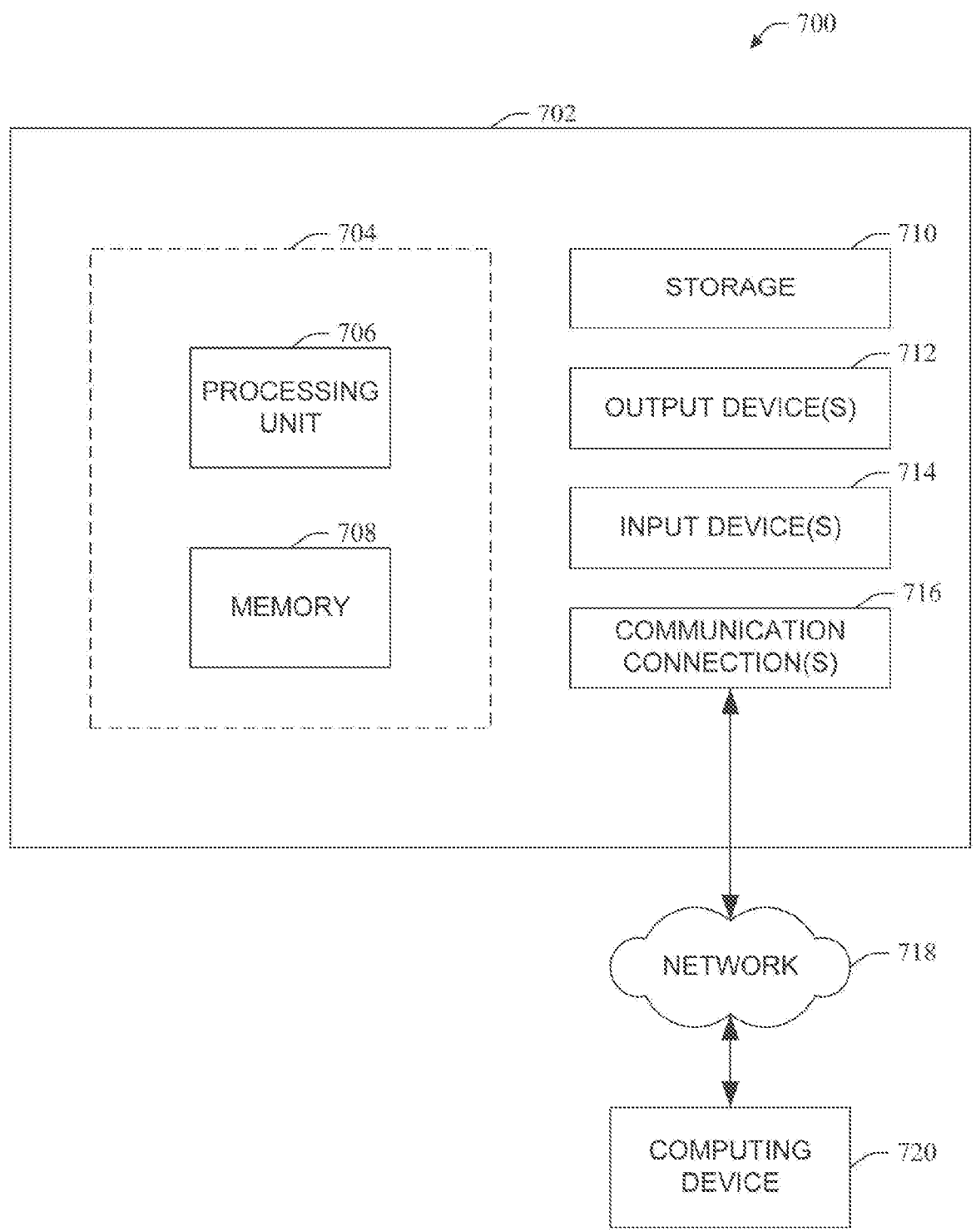
FIG. 7 illustrates a computing environment where one or more of the provisions set forth herein can be implemented, according to some embodiments.

With reference to FIG. 7 and the following discussion provide a description of a suitable computing environment in which embodiments of one or more of the provisions set forth herein can be implemented. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones. Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions can be implemented as program modules, such as functions, objects. Application Programming Interfaces (APIs), data structures, and the like, that perform particular tasks or implement particular abstract data types. Typically, the functionality of the computer readable instructions can be combined or distributed as desired in various environments.

FIG. 7 illustrates a system 700 comprising a computing device 702 configured to implement one or more embodiments provided herein. In one configuration, computing device 702 can include at least one processing unit 706 and memory 708. Depending on the exact configuration and type of computing device, memory 708 may be volatile, such as RAM, non-volatile, such as ROM, flash memory, etc., or some combination of the two. This configuration is illustrated in FIG. 7 by dashed line 704.

In these or other embodiments, device 702 can include additional features or functionality. For example, device 702 can also include additional storage such as removable storage or non-removable storage, including, but not limited to, magnetic storage, optical storage, and the like. Such additional storage is illustrated in FIG. 7 by storage 710. In some embodiments, computer readable instructions to implement one or more embodiments provided herein are in storage 710. Storage 710 can also store other computer readable instructions to implement an operating system, an application program, and the like. Computer readable instructions can be accessed in memory 708 to execute by processing unit 706, for example.

The term "computer readable media" as used herein includes computer storage media. Computer storage media includes volatile and nonvolatile, non-transitory, removable and non-removable media implemented in any method or technology for storage of information such as computer readable instructions or other data. Memory 708 and storage 710 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 702. Any such computer storage media can be part of device 702.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 702 can include one or more input devices 714 such as keyboard, mouse, pen, voice input device, touch input device, infrared cameras, video input devices, or any other input device. One or more output devices 712 such as one or more displays, speakers, printers, or any other output device can also be included in device 702. The one or more input devices 714 and/or one or more output devices 712 can be connected to device 702 via a wired connection, wireless connection, or any combination thereof. In some embodiments, one or more input devices or output devices from another computing device can be used as input device(s) 714 or output device(s) 712 for computing device 702. Device 702 can also include one or more communication connections 716 that can facilitate communications with one or more other devices 720 by means of a communications network 718, which can be wired, wireless, or any combination thereof, and can include ad hoc networks, intranets, the Internet, or substantially any other communications network that can allow device 702 to communicate with at least one other computing device 720.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method comprising:
   displaying, by a processor, a market data plot for a stock asset along a timeline at a user interface;
   providing, by the processor, a selector that provides an option to apply a social network sentiment at the user interface;
   receiving, at the processor, the option to apply a social network sentiment at the selector at the user interface, the social network sentiment being a tracked social network sentiment that is from a set of selectable sentiments where the tracked social network sentiment relates to the stock asset; and
   displaying, by the processor, a social sentiment score plot separate from the market data plot along the timeline where the user interface simultaneously correlates a price of the stock asset along the market data plot with a sentiment score on the social sentiment score plot using an indicator in response to receiving the option to apply the social network sentiment for the tracked social network sentiment.

2. The method of claim 1, further comprising receiving a trading order entry for the stock asset to execute the trading order based on the social network sentiment.

3. The method of claim 1, wherein the tracked social network sentiment is a score metric indicative of at least an emotion reaction towards an event that is posted to an online social network.

4. The method of claim 3, further comprising calculating the social network sentiment as the score metric based on social network factors.

5. The method of claim 4, wherein the social network sentiment is a weighted average of the social network factors.

6. The method of claim 4, further comprising receiving a trading order entry for the stock asset to execute the trading order based on the score metric.

7. The method of claim 1, further comprising providing the option to specify a trading condition that includes an auto trigger to automatically execute a trade for the stock asset based on the social network sentiment.

8. A system, comprising:
   a processing unit; and memory having instructions stored thereon, wherein the instructions, which when executed by the processing unit, configure the processing unit to perform operations that include:
- displaying a market data plot for a stock asset along a timeline at a user interface;
- providing a selector that provides an option to apply a social network sentiment at the user interface;
- receiving the option to apply a social network sentiment as the selector at the user interface, the social network sentiment being a tracked social network sentiment that is from a set of selectable sentiments where the tracked social network sentiment relates to the stock asset; and
- displaying a social sentiment score plot separate from the market data plot along the timeline where the user interface simultaneously correlates a price of the stock asset along the market data plot with a sentiment score on the social sentiment score plot using an indicator in response to receiving the option to apply the social network sentiment for the tracked social network sentiment.

9. The system of claim 8, wherein the instructions further configure the processing unit to receive a trading order entry for the stock asset to execute the trading order based on the social network sentiment.

10. The system of claim 8, wherein the tracked social network sentiment is a score metric indicative of at least an emotion reaction towards an event that is posted to an online social network.

11. The system of claim 10, wherein the instructions further configure the processing unit to calculate the social network sentiment as the score metric based on social network factors.

12. The system of claim 11, wherein the social network sentiment is a weighted average of the social network factors.

13. The system of claim 11, wherein the instructions further configure the processing unit to receive a trading order entry for the stock asset to execute the trading order based on the score metric.

14. The system of claim 8, wherein the instructions further configure the processing unit to provide the option to specify a trading condition that includes an auto trigger to automatically execute a trade for the stock asset based on the social network sentiment.

15. A non-transitory computer readable medium having instructions to control one or more processors configured to:
- display a market data plot for a stock asset along a timeline at a user interface;
- provide a selector that provides an option to apply a social network sentiment at the user interface;
- receive the option to apply a social network sentiment as the selector at the user interface, the social network sentiment being a tracked social network sentiment that is from a set of selectable sentiments where the tracked social network sentiment relates to the stock asset; and
- display a social sentiment score plot separate from the market data plot along the timeline where the user interface simultaneously correlates a price of the stock asset along the market data plot with a sentiment score on the social sentiment score plot using an indicator in response to receiving the option to apply the social network sentiment for the tracked social network sentiment.

16. The non-transitory computer readable medium of claim 15, wherein the one or more processors are further configured to receive a trading order entry for the stock asset to execute the trading order based on the social network sentiment.

17. The non-transitory computer readable medium of claim 15, wherein the tracked social network sentiment is a score metric indicative of at least an emotion reaction towards an event that is posted to an online social network.

18. The non-transitory computer readable medium of claim 17, wherein the one or more processors are further configured to calculate the social network sentiment as the score metric based on social network factors and the social network sentiment is a weighted average of the social network factors.

19. The non-transitory computer readable medium of claim 18, wherein the one or more processors are further configured to receive a trading order entry for the stock asset to execute the trading order based on the score metric.

20. The non-transitory computer readable medium of claim 15, wherein the one or more processors are further configured to provide the option to specify a trading condition that includes an auto trigger to automatically execute a trade for the stock asset based on the social network sentiment.

* * * * *